Sept. 22, 1925.
R. B. FEHR
1,554,961
RAIL JOINT AND PLATE
Filed Dec. 5, 1924
2 Sheets-Sheet 2
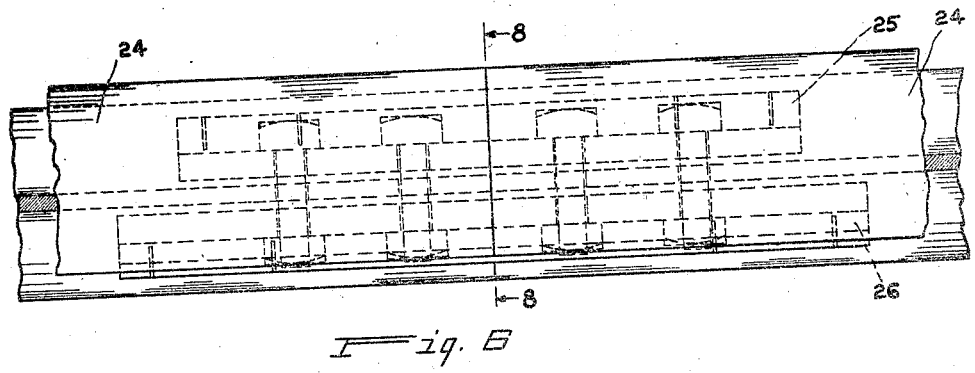
Fig. 6
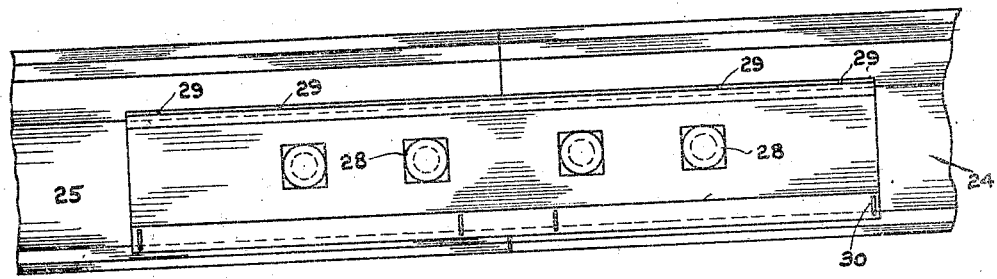
Fig. 7
Fig. 9
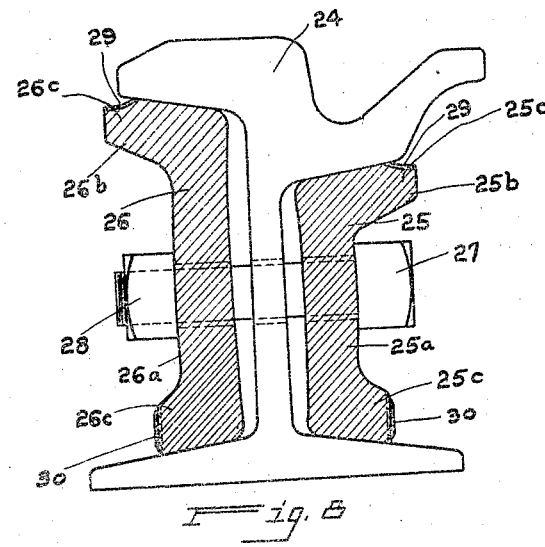
Fig. 8
INVENTOR
Roy B. Fehr
BY
Richey, Slough & Watts
ATTORNEY Patented Sept. 22, 1925.

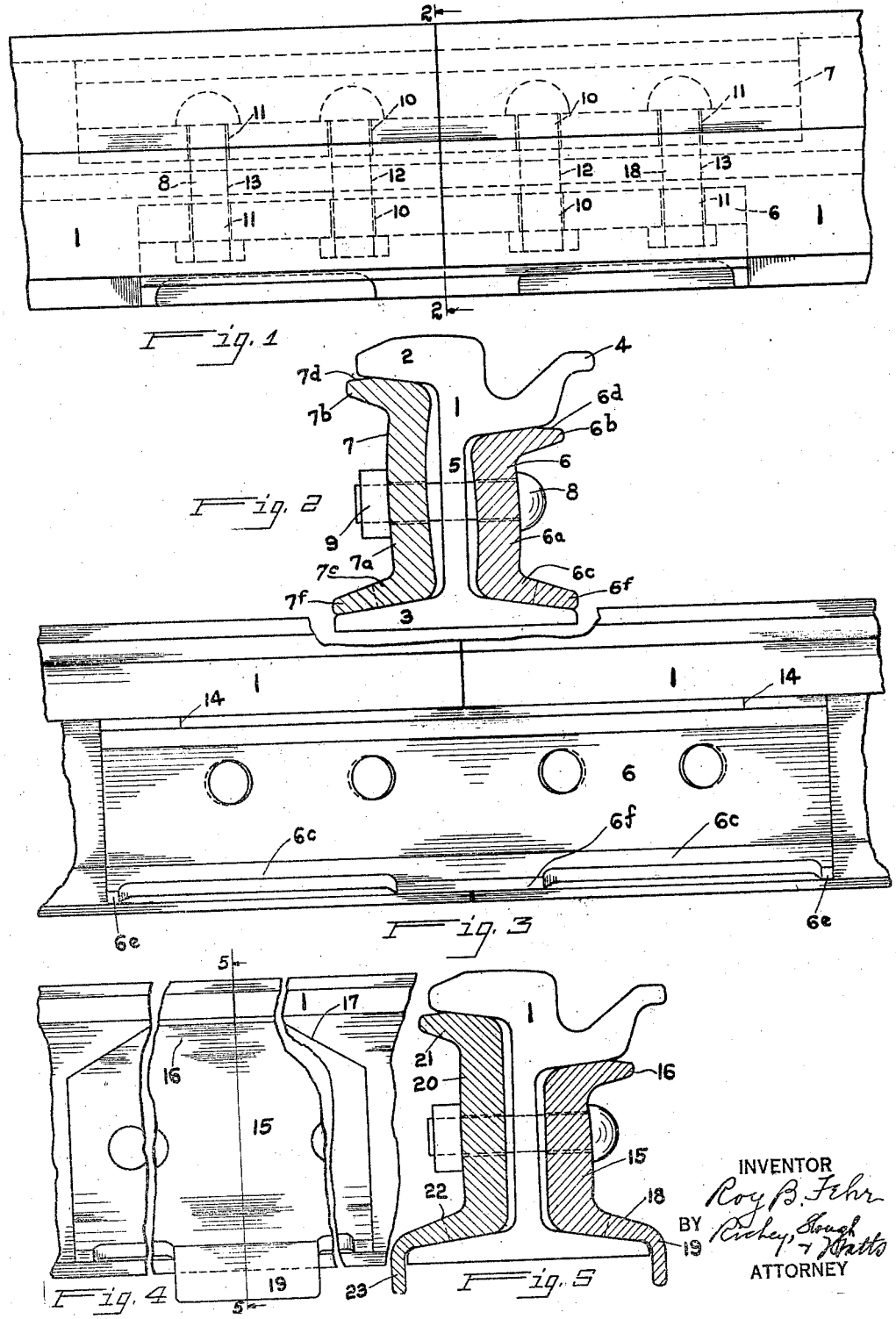

1,554,961

UNITED STATES PATENT OFFICE.

ROY B. FEHR, OF CLEVELAND, OHIO, ASSIGNOR TO THE RAIL WELDING & BONDING COMPANY, OF CLEVELAND, OHIO, A CORPORATION OF DELAWARE.

RAIL JOINT AND PLATE.

Application filed December 5, 1924. Serial No. 754,194.

*To all whom it may concern:*

Be it known that I, ROY B. FEHR, a citizen of the United States, residing at Cleveland, in the county of Cuyahoga and State of Ohio, have invented certain new and useful Improvements in Rail Joints and Plates, of which the following is a specification.

This invention relates to rail joints and to plates thereof.

It also relates to a joint plate shaped to be seam welded to a rail base remote from the edge of the rail; to support molten weld seam metal in contact with the rail head and having a high section modulus.

It also relates to a new and improved joint plate provided with means for indicating the proper position of seam weld metal with respect to a rail.

It further relates to a joint plate of simple configuration and improved strength which is easy and cheap to manufacture, which is adapted suitably to position weld metal adjacent to and under the rail head and permit weld metal to be positioned remote from the edge of the rail base, and which embodies means for indicating to the welder the proper predetermined position of weld metal.

In the drawings accompanying and forming a part of this specification:

Fig. 1 is a top plan view of a joint constructed in accordance with my invention;

Fig. 2 is a vertical elevation partly in section taken on line 2—2 of Fig. 1;

Fig. 3 is a side elevation looking toward the right side of Fig. 2;

Fig. 4 is a fragmentary view similar to Fig. 3 but looking toward the left side of Fig. 2 and showing a modified form of joint;

Fig. 5 is a view similar to Fig. 2 taken on line 5—5 of Fig. 4, and

Figs. 6, 7 and 8 are respectively top plan, side elevation and cross sectional views of a joint with plates embodying a modified form of my invention.

Fig. 9 is a fragmentary sectional view of the rail web and plates showing how the tapered pins are used to set up mutual endwise compression of the rail ends.

Referring first to Figs. 1, 2 and 3, 1 indicates aligned, grooved rails having heads 2, bases 3, lips 4 and webs 5, on either side of which rails are positioned joint plates 6 and 7 which are channel shaped in cross section and which are shown as consisting respectively of arched or bowed webs $6^a$ and $7^a$, head flanges $6^b$ and $7^b$ and base flanges $6^c$ and $7^c$. The flanges $6^b$, $7^b$, $6^c$ and $7^c$ have enlarged areas of fishing contact with the heads 2 and bases 3 of the rails, as more clearly shown in Fig. 2. The plates 6 and 7 may be held in assembled relation before welding with the rails 1 in part by bolts 8 passing therethrough and nuts 9. The head flanges $6^b$ and $7^b$ are provided with weld metal receiving surfaces extending well beneath the adjacent rail heads to form recesses and extending forwardly of the rail heads to form ledges $6^d$ and $7^d$ which serve as means for supporting molten seam weld metal to be joined to the outer and underside surfaces of the rails 1 and to the plates 6 and 7. The base flanges $6^c$ and $7^c$ are extended laterally beyond the webs $6^a$ and $7^a$ but stop short of the edges of the rail base but at the ends of the plates are further extended as at $6^e$ and $7^e$ so as to be substantially flush with the outer edges of the bases 3. Also these flanges are extended intermediate the ends of the rails as at $6^f$ and $7^f$ to a point substantially flush with the edges of the rail bases 3. Between the extensions $6^e$ and $6^f$ and $7^e$ and $7^f$ the edges of the flanges $6^c$ and $7^c$ may be welded to the rail base remote from the edge of the rail base while these extensions constitute means for indicating the predetermined position of the seam weld metal with respect to the plate and also for locating the seam weld metal at predetermined places on the rail base. The extensions $6^e$ and $6^f$ and $7^e$ and $7^f$ likewise afford additional strengthening means to the plates 6 and 7, the extensions $6^f$ and $7^f$ in particular serving further to increase the section modulus of the plates adjacent to the meeting ends of the rails 1. It will be understood, however, that I may omit extensions $6^e$, $6^f$, $7^e$ and $7^f$.

It will be noted in Fig. 1 that the plates 6 and 7 are in all respects substantially similar except that the plate 6 is shorter than plate 7. With plates of different length assembled in pairs as shown and both provided with bolt holes for bolts 8 in substantial alignment, the ends of the plates are automatically staggered.

The plates 6 and 7 are each provided with holes 10 and 11, respectively, which are in substantial alignment but out of alignment slightly with corresponding holes 12 and 13, respectively, through the webs 5 of rails 1, the holes 10 and 11 corresponding respectively with holes 12 and 13. After the rails have been assembled substantially as shown in Fig. 3 and the plates 6 and 7 placed in position thereon, tapered pins 10', Fig. 9, may be driven, for example, into the holes 10 and 12 thereby setting up mutual endwise compression in the rail ends and permitting the insertion of bolts 8 through holes 11 and 13 which serve to hold the plates and rails in such assembled position while similar bolts are placed in holes 10 and 12 to replace the tapered pins. After being assembled in this manner, seam weld metal may be formed, by any suitable means such as by the metal or carbon arc processes, the top weld metal receiving surfaces of the flanges 6$^b$ and 7$^b$ to secure the plates 6 and 7 to the heads of the rails 1 and on the rail bases remote from the edges thereof to secure the plates to the rail bases. In forming the seam weld metal between the head flanges and the rail heads, I prefer to stop the seam welds short of the ends of the plates substantially as indicated at 14 in Fig. 3. The extensions 6$^e$ and 6$^f$ and 7$^e$ and 7$^f$ furnish automatic means for stopping the seam metal short of the ends of the plates and for indicating its position with respect to the plate and for positioning it in predetermined locations upon the rail base.

In Figs. 4 and 5 I have illustrated a modified form of a joint plate where 15 indicates a plate channel shaped in cross section and resembling plate 6 except that the head flange 16 and a part of the web are cut away at either end thereof as at 17, that is, the flange 16 is of less length than the web of the plate 15, whereby termination of the seam weld metal is automatically provided for, since no means is provided to support the molten metal in contact with the head. Furthermore, the plate 15 is provided intermediate its ends with an extension 19 of the base flange 18 of sufficient length to permit its being turned downwardly past the edge of the base of rail 1, as shown in Fig. 5. This extension 19 serves as a means of additionally strengthening the plate 15 and increasing its section modulus as well as positioning seam weld metal on the base of the rail, as described above in connection with extensions 6$^f$ and 7$^f$ of plates 6 and 7.

It will be understood that plate 20 is similar in substantially all respects to plate 7, except that it has its head flange 21 cut away at either end thereof substantially as shown in Fig. 4 for plate 15 and for substantially the same purpose. An extension 23 of the base flange 22 intermediate the ends of the plate corresponds to extension 19 on plate 15.

It will be understood that plates 6 and 7 may have their head flanges cut away as shown in Figs. 4 and 5, if desired, and similarly that these plates may be provided with extensions corresponding to extensions 19 and 23 of Figs. 4 and 5.

When plates 15 and 20 are of different lengths and assembled in pairs as shown by plates 6 and 7 of Fig. 1 and seam weld metal is employed to unite the plates to the head and bases of the rails, the ends of the weld metal will be automatically staggered thus providing a fillet effect between the rail and the weld metal.

In Figs. 6 to 8, inclusive, 24 indicates two aligned, substantially abutting rails on opposite sides of each of which are assembled plates 25 and 26 which plates are secured in position partly by means of bolts 27 and nuts 28. The plates 25 and 26 resemble in many respects the plates 6 and 7 and 15 and 16 hereinabove described. The plates 25 and 26 each have substantially similar shaped cross sections and comprise web portions 25$^a$ and 26$^a$, head flanges 25$^b$ and 26$^b$ and base flanges 25$^c$ and 26$^c$. The head flanges 25$^b$, 26$^b$ have extended fishing areas of contact with the heads of rails 24 as indicated and are provided on their upper surface with weld metal receiving surfaces extending well beneath the adjacent rail heads to form a recess and extending forwardly of the said heads to form ledges 25$^e$ and 26$^e$. The surfaces 25$^e$ and 26$^e$ may be of various configurations such for example as being beveled as shown in Figs. 2 and 5, or substantially horizontal or slightly curved as shown in Fig. 8. Either of these forms is susceptible of formation in a rolling operation. Base flanges 25$^c$ and 26$^c$ of the plates extend outwardly toward but stop short of the edges of the bases of rails 24, thereby making possible the disposition of seam weld metal in contact with the rail base and sides of the plates remote from the edges of the rail bases.

When bolts with square heads such as bolts 27 are used and the head engages with the plate 25, the corners of the head will bear against the head flange 25$^b$ and prevent turning of the bolt when the nut 28 is tightened against plate 26. It will be understood by those skilled in that art that plates 6 and 15 may likewise serve to prevent turning of the bolts provided bolts are employed having square heads.

In Figs. 6, 7 and 8 I have shown means for indicating the proper position of weld metal with respect to the plates, this means comprising small rib-like projections 29 formed on the surfaces 25$^e$ and 26$^e$ and similar projections 30 formed on the upright side surfaces of the base flanges 25$^c$ and 26$^c$. These projections 29 and 30 serve to indicate to the welder the points between which molten weld metal should be formed. It will be noted by reference to Figs. 6 and 7 that each plate has four projections 29, these projections being provided to indicate to the welder the portion of the plate along which weld metal is to be formed in a single operation and another portion along which weld metal is to be formed by two operations. The projections 30 may likewise indicate portions of the plate along which the weld metal is to be formed in one or more operations or they may indicate that no weld metal is to be formed at the meeting ends of the rails. Although the means were provided for indicating the position of the weld metal with respect to the plates comprising the rib-like projections 29 and 30, it will be obvious to those skilled in the art that slight depressions might be employed instead of these projections. Whether depressions or projections are employed for this purpose may be determined by manufacturing conditions.

It will be observed that I have provided joint plates combining increased strength with proper positioning of the weld metal with respect to the rail with highly efficient contact and consequently increased strength of the joint. It will further be observed that I have provided means for indicating to the welder the proper position for the weld metal with respect to the plates.

It will also be seen that I have been able to construct a strong rail joint in a simple manner and with parts which are easy to make. The channeled plates afford maximum strength while permitting weld metal to be joined to the plates and bases at points remote from the edges of the rail bases.

It will also be noted that each of the plates is provided with relatively large fishing areas for contact with the rail. Since the bearing pressure per unit of area varies inversely with the fishing areas, plates having enlarged fishing areas have correspondingly decreased unit bearing pressures. A direct result of decreasing the unit bearing pressure on the plates is to tend to diminish the distortion of the plates.

My invention has been set forth hereinabove in some detail by referring to certain specific parts. It will be understood, however, that changes in such parts and details have been shown only for purposes of illustration and not for the purpose of limiting the invention, the spirit and scope of which is defined by what is claimed.

What I claim is:

1. The method of constructing a seam welded rail joint which comprises aligning adjacent rail ends, fitting in fishing relation on opposite sides of the rail ends joint plates of channel shaped cross section, said plates each having a top flange provided with a weld metal receiving surface at the top edge extending well beneath the adjacent rail head to form a recess and extending forwardly of the said head to form a ledge and having a base flange extending outwardly toward the edge of the rail base but stopping short thereof and having an upright seam weld metal engaging surface, bringing the rail heads together under moderate mutual endwise compression through the instrumentality of the joint plates, fusing with an electric arc adjacent portions of the rail head, the upper surface of each plate and additional metal from a welding rod to form a seam weld disposed in the recess and on the ledge and integrally united to the rail head and plate and forming seam welds integrally uniting the vertical portions of the base flanges of the plates and the adjacent portions of the rail bases.

2. The method of constructing a seam welded rail joint which comprises aligning adjacent rail ends, fitting in fishing relation on opposite sides of the rail ends joint plates of channel shaped cross section having their ends unaligned, said plates each having a top flange provided with a weld metal receiving surface at the top edge extending well beneath the adjacent rail head to form a recess and extending forwardly of the said head to form a ledge, driving drift pins through the slightly unaligned holes in the plates and rail ends to bring the rail heads together under moderate mutual endwise compression, fusing with an electric arc adjacent portions of the rail head, the upper surface of each plate and additional metal from a welding rod to form a seam weld disposed in the recess and on the ledge and integrally united to the rail head and plate and forming seam welds integrally uniting the vertical portions of the base flanges of the plates and the adjacent portions of the rail bases.

3. The method of constructing a seam welded rail joint which comprises aligning adjacent rail ends, fitting in fishing relation on opposite sides of the rail ends joint plates of channel shaped cross section having their ends unaligned, said plates each having a top flange provided with a weld metal receiving surface at the top edge extending well beneath the adjacent rail head to form a recess and extending forwardly of the said head to form a ledge, driving drift pins through the slightly unaligned holes in the plates and rail ends to bring the rail heads together under moderate mutual endwise compression, fusing with an electric arc adjacent portions of the rail head, the upper surface of each plate and additional metal from a welding rod to form a seam weld disposed in the recess and on the ledge and integrally united to the rail head and plate and forming seam welds integrally uniting the vertical portions of the base flanges of the plates and the adjacent portions of the rail bases, all of said seams stopping short of the ends of the plates and ending in different vertical planes.

4. A seam welded rail joint comprising aligned adjacent rail ends, channel shaped joint plates arranged on opposite sides of the rail ends engaging the heads and bases of the rails in fishing relation, each said plate having a surface along the top edge thereof extending well beneath the adjacent rail head to form a recess and extending forwardly of the said head to form a ledge, seam weld metal in each said recess and on each said ledge integrally united to the said plates and the rail heads, and base seam welds integrally uniting the rail bases and the plates.

5. A seam welded rail joint comprising aligned adjacent rail ends, channel shaped joint plates arranged with their ends unaligned on opposite sides of the rail ends engaging the heads and bases of the rails in fishing relation, each said plate having a surface along the top edge thereof extending well beneath the adjacent rail head to form a recess and extending forwardly of the said head to form a ledge, seam weld metal in each said recess and on each said ledge integrally united to the said plates and the rail heads, and base seam welds integrally uniting the rail bases and the plates.

6. A seam welded rail joint comprising aligned adjacent rail ends having their heads under mutual endwise compression, channel shaped joint plates arranged on opposite sides of the rail ends engaging the heads and bases of the rails in fishing relation, each said plate having a surface along the top edge thereof extending well beneath the adjacent rail head to form a recess and extending forwardly of the said head to form a ledge, seam weld metal in each said recess and on each said ledge integrally united to the said plates and the rail heads, and base seam welds integrally uniting the rail bases and the plates.

7. A seam welded rail joint comprising aligned adjacent rail ends having their heads under mutual endwise compression, joint plates arranged on opposite sides of the rail ends each engaging the heads and bases of the rails in fishing relation, and having head and base flanges to form a channel section, each said head flange being provided with a weld metal receiving surface extending well beneath an adjacent rail head to form a recess and extending forwardly of said rail head to form a ledge and each said base flange having a vertical weld metal engaging surface, seam weld metal in each said recess and on each said ledge integrally united to said plates and rail heads, and base seam welds integrally uniting the rail bases and the vertical portions of the base flanges of the plates.

8. A seam welded rail joint comprising aligned adjacent rail ends having their heads under mutual endwise compression, joint plates arranged on opposite sides of the rail ends and engaging the heads and bases of the rails in fishing relation, and having head and base flanges to form channel sections, each said head flange being provided with a weld metal receiving surface extending well beneath an adjacent rail head to form a recess and extending forwardly of said rail head to form a ledge and each said base flange having a vertical weld metal engaging surface, seam weld metal in each said recess and on each said ledge integrally united to said plates and rail heads and base seam welds integrally uniting the rail bases and the vertical portions of the base flanges of the plates, all of said seam welds stopping short of the ends of the plates.

9. A seam welded rail joint comprising aligned adjacent rail ends having their heads under mutual endwise compression, joint plates arranged on opposite sides of the rail ends and engaging the heads and bases of the rails in fishing relation and having head and base flanges to form channel sections, each said head flange being provided with a weld metal receiving surface extending well beneath an adjacent rail head to form a recess and extending forwardly of said rail head to form a ledge and each said base flange having a vertical weld metal engaging surface, seam weld metal in each said recess and on each said ledge integrally united to said plates and rail heads, and base seam welds integrally uniting the rail bases and the vertical portions of the base flanges of the plates, all of said seam welds stopping short of the ends of the plates and ending in different vertical planes.

10. A seam welded rail joint comprising aligned adjacent rail ends, joint plates arranged on opposite sides of the rail ends and engaging the heads and bases of the rails in fishing relation and having head and base flanges and having their ends unaligned, each said head flange being provided with a weld metal receiving surface extending well beneath an adjacent rail head to form a recess and extending forwardly of said rail head to form a ledge and each said base flange having a vertical weld metal engaging surface, seam weld metal in each said recess and on each said ledge integrally united to said plates and rail heads, and base seam welds integrally uniting the rail bases and the vertical portions of the base flanges of the plates, all of said seam welds stopping short of the ends of the plates and ending in different vertical planes.

11. A seam welded rail joint comprising aligned adjacent rail ends, joint plates arranged on opposite sides of the rail ends and engaging the heads and bases of the rails in fishing relation, and having head and base flanges to form channel shaped sections, each said head flange being provided with a weld metal receiving surface extending well beneath an adjacent rail head to form a recess and extending forwardly of said rail head to form a ledge and each said base flange having vertical weld metal engaging surfaces and an outwardly extending projection intermediate the ends of the plate, seam weld metal in each said recess and on each said ledge integrally united to said plates and rail heads, and base seam welds integrally uniting the rail bases and the vertical portions of the base flanges of the plates.

12. A seam welded rail joint comprising aligned adjacent rail joint plates arranged on opposite sides of the rail ends and engaging the heads and bases of the rails in fishing relation and having head and base flanges to form channel shaped sections, each said head flange being provided with a weld metal receiving surface extending well beneath an adjacent rail head to form a recess and extending forwardly of said rail head to form a ledge and each said base flange having vertical weld metal engaging surfaces and an outwardly extending projection intermediate the ends of the plate, seam weld metal in each said recess and on each said ledge integrally united to said plates and rail heads and base seam welds integrally uniting the rail bases and the vertical portions of the plate base flanges, all of said seam welds stopping short of the ends of the plates and ending in different vertical planes.

13. A seam welded rail joint comprising aligned adjacent rail ends, joint plates arranged on opposite sides of the rail ends and engaging the heads and bases of the rails in fishing relation and having head and base flanges to form channel shaped sections, each said head flange being provided with a weld metal receiving surface extending well beneath an adjacent rail head to form a recess and extending forwardly of said rail head to form a ledge and each said base flange having vertical weld metal engaging surfaces and an outwardly extending projection intermediate the ends of the plate and outwardly extending projections at the ends of the plate, seam weld metal in each said recess and on each said ledge integrally united to said plates and rail heads, and base seam welds integrally uniting the rail bases and the vertical portions of the plate base flanges, all of said seam welds stopping short of the ends of the plates and ending in different vertical planes.

14. A seam welded rail joint comprising aligned adjacent rail ends, joint plates arranged on opposite sides of the rail ends engaging the heads and bases of the rails in fishing relation, each said plate having a web and head and base flanges projecting outwardly from the web at opposite edges thereof, the said head flange being of less length than the web and being provided with a weld metal receiving surface extending well beneath an adjacent rail head to form a recess and extending forwardly of said rail head to form a ledge, seam weld metal in each said recess and on each said ledge integrally united to said plates and rail heads, and base seam welds integrally uniting the rail bases and base flanges of the plates.

15. In a welded rail joint, joint plates having upright webs lying within the fishing space of the rails, and top and bottom outwardly deflected flanges, the top flange being provided with a welding surface extending well beneath an adjacent rail head to form a recess and extending forwardly of said rail head to form a ledge, the bottom flange being formed with an outer welding face disposed substantially in a vertical plane, the said recessed portion of the top flange and the vertical face of the bottom flange being located outside of the zone of the load-carrying web portion of the plate.

16. In a welded rail joint, joint plates having upright webs lying within the fishing space of the rails, and top and bottom outwardly deflected flanges, the top flange being provided with a welding surface extending well beneath the adjacent rail head to form a recess disposed in a substantially horizontal plane and extending forwardly of said rail head to form a ledge, the bottom flange being formed with an outer welding face disposed substantially in a vertical plane, the inner part of the said recessed portion of the top flange and the said vertical face of the bottom flange lying inside of the outer edge of the rail head.

17. In a welded rail joint, a joint plate comprising a vertical web portion and offset top and bottom flanges, the said bottom flange lying inside of the vertical plane of the outer side of the rail head, the top flange being provided with a substantially horizontally disposed welding surface extending from well beneath the adjacent rail head outwardly beyond the adjacent portion of said rail head to form a ledge, the bottom flange being provided with a substantially vertical welding face, said recess and ledge and said vertical face being located outside of the zone of the load-carrying portion of the plate.

18. A joint plate for welded rail joints, channel shaped in cross section and having a top weld metal receiving surface adapted to extend well beneath an adjacent rail head to form a recess and forwardly of said rail head to form a ledge.

19. As a new article of manufacture a rolled joint plate for welded rail joints having head and base flanges to form a channel section, said head flange being provided with a weld metal receiving surface adapted to extend well beneath an adjacent rail head to form a recess and forwardly of said rail head to form a ledge and said base flange having a substantially vertical weld metal engaging surface.

20. As a new article of manufacture a rolled joint plate for welded rail joints, said plate having an outwardly bowed web portion and having head and base flanges to form a channel section, said head flange being provided with a weld metal receiving surface adapted to extend well beneath an adjacent rail head to form a recess and forwardly of said rail head to form a ledge, said base flange having a substantially vertical weld metal engaging surface.

21. As a new article of manufacture a joint plate for welded rail joints having head and base flanges to form a channel section, and means formed in the edges of said flanges for indicating the desired length of seam welds.

22. A joint plate for welded rail joints having head and base flanges, said head flange being provided with a weld metal receiving surface adapted to extend well beneath an adjacent rail head to form a recess and forwardly of said rail head to form a ledge, said base flange having substantially vertical weld metal engaging surfaces and an outwardly extending projection intermediate the ends of the plate.

23. A joint plate for welded rail joints having head and base flanges, said head flange being provided with a weld metal receiving surface adapted to extend well beneath an adjacent rail head to form a recess and forwardly of said rail head to form a ledge, said base flange having substantially vertical weld metal engaging surfaces, outwardly extending projections at the ends of the plate and one intermediate the ends of the plate.

24. A joint plate for welded rail joints having head and base flanges, said head flange being provided with a weld metal receiving surface adapted to extend well beneath an adjacent rail head to form a recess and forwardly of said head to form a ledge, said base flange having substantially vertical weld metal engaging surfaces, outwardly extending projections at the ends of the plate and one intermediate the ends of the plate adapted to extend beyond said rail base and downwardly therebeyond.

25. A joint plate for welded rail joints having a web and a head flange, the said head flange being of less length than the web and being provided with a weld metal receiving surface adapted to extend well beneath the adjacent rail head to form a recess and forwardly of said rail head to form a ledge.

In testimony whereof I hereunto affix my signature this 28th day of November, 1924.

ROY B. FEHR.